Inventors
Walter Hahnemann,
Alard du Bois-Reymond
Erich Rother,
Wilhelm Rudolph, and
Gustav Wolff
by Knight Bro
Attorneys May 11, 1926.

W. HAHNEMANN ET AL

METHOD OF TESTING MATERIALS

Filed August 23, 1921   6 Sheets—Sheet 4

Inventors
Walter Hahnemann,
Alard du Bois-Reymond,
Erich Rother,
Wilhelm Rudolph, and
Gustav Wolff
by Knight Bros
Attorneys

Patented May 11, 1926.

1,583,877

UNITED STATES PATENT OFFICE.

WALTER HAHNEMANN, OF KITZEBERG, NEAR KIEL, ALARD DU BOIS-REYMOND, OF PLON, NEAR KIEL, ERICH ROTHER, WILHELM RUDOLPH, AND GUSTAV WOLFF, OF KIEL, GERMANY, ASSIGNORS TO THE FIRM SIGNAL GESELLSCHAFT M. B. H., OF KIEL, WERK RAVENSBERG, GERMANY.

METHOD OF TESTING MATERIALS.

Application filed August 23, 1921. Serial No. 494,575.

The method of testing material, particularly metal, has hitherto chiefly consisted in causing trial pieces of a certain shape, especially rods, to be torn or twisted by longitudinal or torsional stresses, and in determining the alterations of their lengths and the stresses at their snapping points or their resistance to torsion. The stresses imposed on the material were generally purely statical and the machines required were expensive and bulky.

In accordance with this invention the statical method is substituted by a dynamical one and at the same time it provides special conditions for the latter. An important feature of the invention consists in the material to be tested being adequately shaped and connected, in the form of elastic members, or of parts of such members, between bodies or masses designed to execute vibrations, and in causing the vibratory structure thus formed to carry out vibrations by exciting it by mechanical or electrical means. The exciting force should be as nearly as possible in resonance with the vibratory structure which should have a pronounced natural rate of vibration. If this were not the case the number of reversals of the stresses could only be increased to an inconsiderable degree, and besides the operation of determining the magnitudes of the stresses imposed on the material would be comparatively troublesome and unreliable.

With the novel method of testing, the operation of measuring the stresses to which the materials are subjected is very simple. The effect exerted on the material is defined by the magnitude of the moving mass engaging with the trial or tested piece, the amplitude of this mass and its rate of vibration. Furthermore the point at which a change of the elastic properties of the trial piece commences may be readily recognized on account of the fact that the natural rate of vibration of the vibratory structure made up of the vibrating masses and the trial piece alters at the said point. A highly accurate determination of the said material, even if the rate of vibration is very high, can easily be made by known methods.

The kind of stress applied (dynamic instead of statical) is particularly adapted for the testing of materials destined to be subjected to dynamical stresses in practical use. By varying the periodicity between wide limits the conditions under which the material is tested can be made to very closely approximate the actual service conditions. This applies particularly to material to be used for the construction of machines and air craft. The necessary measurements of periodicities, amplitudes of oscillation, etc., may also all be carried out with the aid of known methods and arrangements. In cases in which the vibratory structures are excited electrically—which form of excitation will be the most usual—the rate of vibration can be determined by any ordinary frequency meter. It may also be ascertained in a simple manner from the speed of revolution of the alternating current generator. The amplitude of oscillation can be measured with aid of a micrometer, microscope or also electrically. In the latter case the constants in question are measured at the electromagnetic vibrator. Another method which may be employed in all cases consists in connecting the vibrating parts to a measuring arrangement based on the principle of the telephone or some other electromagnetic principle. The novel method of testing materials enables very accurate and cheap tests to be made such as the following: In the first place, trial pieces or bodies may be made from the material that is to be used for the particular purpose in view and by stretching these pieces to limit of their elasticity a criterion as to whether they possess the required properties may be obtained. If the material is found to meet the requirements the products are made from it and when they are completed they may be again subjected to a similar test. A test of this kind takes very little time and will furnish the proof as to whether or not the finished product will really meet service conditions. This process of dynamically testing each individual piece of work has hitherto been impracticable on account of the time and costs that a test that really corresponded to service conditions would have consumed, but no longer presents any difficulties when a testing machine constructed in accordance with the invention is used, because, at a frequency of 1000 per second the vibratory structure in the same permits of the material being subjected to stress 86,400,000 times a day. Due to the fact that the material to be tested is arranged in the form of an elastic connecting member, or of a part of such (elastic force), between two vibrating masses, the conditions obtained are much simpler than in the cases of structures in which the vibrating masses and elastic force are uniformly distributed over the entire body of the vibratory structure; and the amplitudes of the vibrations can be calculated and the stress on the material can be directly determined.

The procedure in carrying out such tests will generally be such that the material to be tested is not subjected beforehand to any tension or pressure, in other words the oscillatory stresses to which the material is subjected will give rise to alternate tension and compression or to twistings the tested piece. If it is a question of subjecting material only to tension, compression or unidirectional torsional stresses the piece of material to be tested is subjected beforehand, in accordance with the invention, to a statical tension or pressure by which the compressional, expansional or torsional phase of the oscillation is eliminated. The statical tensional or compressional effect on the tested body may be produced by electromagnetic or hydraulic means or by spring-power or gravity. The simplest manner of producing this effect is to make one of the vibrating masses of which the vibratory structure is formed sufficiently large and to suspend this mass from the other mass by means of a stem or rod consisting of the material to be tested.

The measurements and tests for determining the torsion to which the tested material is subjected may be carried out in the following manner: A rod-shaped body consisting of the material to be tested is fixed at its one end. The other end is provided with a mass adapted to be acted upon by a force of any desired kind by which a torsional effect on the rod is produced. This force may be generated by an electromagnet or by some mechanical means giving rise to friction, or a blowing effect or the like.

In the case of large and long finished parts, such as shafts which are to be subjected to torsion, the amount of twist that has to be applied to the entire body to be tested before the point at which deformation takes place is reached, would involve vibrations of excessive amplitude, which would have the subsidiary effect of reducing the periodicity. In such cases the tests may be carried out in the following manner. The shaft to be tested is suspended or fixed at the middle and its two ends are loaded with masses. Torsional forces are then applied to the two masses which act in a difference of phase of 180°. A nodal point will thus be caused to arise at the point of suspension so that the torsional stress on the shaft will be twice as great if only one said force were applied to a shaft of the same length. If the length of the shaft is such that the testing of the same could only be carried out with very large apparatus the necessity for using a very large apparatus may be obviated by testing the shaft in sections each of which only requires an apparatus of the available size. In proceeding in this manner the masses or weights are attached to the ends of the particular section to be tested and torsional forces are made to act upon these sections in the manner described above. The torsion of the shaft that occurs under service conditions can easily be obtained by summation of the individual angles of twist or of the amplitude multiplied by a corresponding constant. In employing this method it is necessary in determining the results of the measurements to make allowance in each case for the effect of the mass and the elastic force of the protruding section of the shaft. But in most cases the masses will be made so great that the mass of the shaft will be negligible in comparison with the torque of the said masses.

If a body that is made from the material to be tested is used as the only elastic member of the vibratory structure the elastic properties of this body will result in the testing of the same being limited to a certain extent. A further feature of the invention consists in a means for obtaining vibrations which are independent of the elasticity of the trial piece so as to enable faultless tests to be made. This is accomplished by connecting the piece to be tested in parallel with the vibratory system of the testing apparatus. Such systems consist of two masses connected by an elastic member in such a way that the system has a pronounced natural rate of vibration. The trial piece is connected between the two masses, i. e. in parallel with the elastic member of which the apparatus normally consists and the dimensions of the rod to be tested are made such that its total elastic force is small compared to that of the vibratory system. The whole system is excited in a suitable manner, as by an electro-magnet supplied with an alternating current, and the frequency of the exciting force is made equal to the natural rate of vibration of the vibratory system. The elastic properties of the trial piece can then be determined from the resulting frequency of resonance as compared with the frequency that obtains when no trial piece is inserted in the apparatus, and from the known dimensions of the trial piece. The forces exerted may be directly ascertained from an indication of the electrical energy consumed.

By connecting the trial rod in parallel with the elastic member of the apparatus the disadvantage arises that the distance between the ends of the rod to be tested is fixed once and for all on account of the fixed distance between the two masses in the apparatus, so that the rod is bent as a result of the expansion caused by the stresses. As a consequence of this, the strain on the elasticity of the trial or sample rod no longer acts in a longitudinal direction only, but shearing and bending effects, and in fact all manner of lateral stresses occur.

These difficulties are overcome by another feature of the invention which consists in connecting the sample rod to a complete vibratory structure on the one hand, and to a ponderous, inert mass on the other hand, the said vibratory structure consisting of vibrating masses interconnected by an elastic member, and the weight of the said inert mass being taken up by a statical force which does not affect the vibrations of the vibratory structure but relieves the sample rod of the weight of the inert mass. The inert mass may be connected to the vibrating structure proper in such a way that its weight does not affect this structure or the sample rod. By "inert," we mean inert to the vibrations of the vibratory structure.

In practice the construction of the vibratory structure is preferably such that the one of its two masses that is not joined to the sample or trial-rod is large in comparison with the second mass. The large mass then remains practically motionless when the vibratory structure is in vibration, while the smaller mass, which will hereinafter be called "the vibrating or live mass" executes vibrations. The sample rod, whose one end is connected to the live mass of the vibratory structure, has its other end connected to the ponderous mass which remains practically motionless during vibrations of the said structure but which is adapted to be shifted bodily in the direction of the longitudinal vibrations of the vibrating system when the length of the sample rod is altered by static forces. The result achieved by such an arrangement is that the sample rod is only subjected to stresses caused by vibrations, viz by the vibration of the live mass, but is not affected by statical stresses. The force which supports the inert mass is preferably supplied by a spring by which the mass is suspended from the vibration structure, or the said force may be exerted by some other special supporting device.

In the above described cases in which the sample body or rod to be tested is placed between a vibratory structure on the one hand and a special mass on the other hand, the sample rod acts as a part of the elastic member of the apparatus. The special mass in which the one end of the rod is fixed keeps this end motionless. Hence the entire force of elasticity of the rod acts upon the vibrating parts of the vibratory structure and must be added to the force of elasticity of this structure. That this is so is found in practice when platting the resonance curve of the vibratory system, and this curve shows that the system is mono-resonant, i. e. has a single frequency of resonance.

The invention is diagrammatically illustrated in the accompanying drawings in which—

Fig. 3 is a vertical section and

Fig. 15 shows another device whose general arrangement corresponds to that of Fig. 12, but which is arranged in a horizontal position and has its inert mass supported on rollers, wheels, balls or the like.

Figure 1:
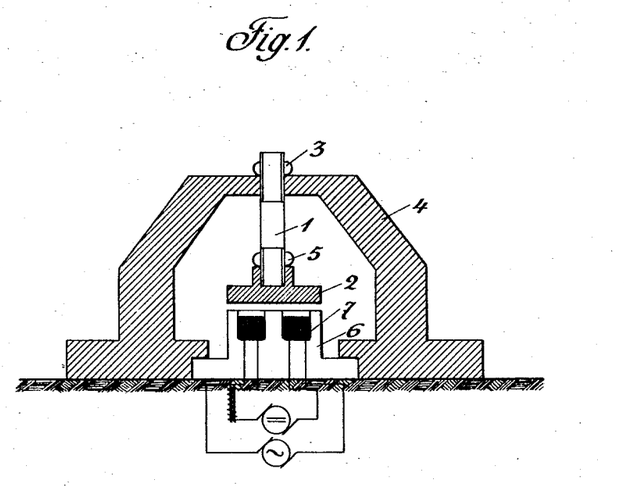
Fig. 1 is a diagrammatic vertical section of a device in which the body or rod to be tested forms the elastic member of a vibratory structure, the rod having a "live" weight attached to its bottom end.

In the apparatus shown in Fig. 1 the material or rod to be tested is screwed into a support 4 and secured by a locknut 3. Screwed fast and secured by a locknut 5 to the bottom end of the rod is an iron weight or mass 2 which acts as the armature of an electromagnet. It is thus seen that the vibratory structure is composed of the parts 1 and 2, the "live" part 2 being alternately attracted by the electromagnet 6 and retracted by the elasticity of the stretched rod 1 when alternating current is sent through the coil 7 of the electromagnets.

Figure 2:
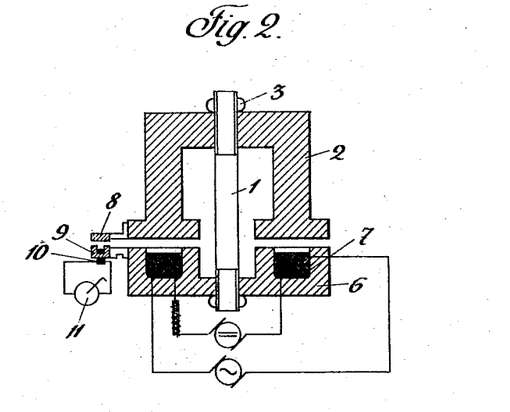
Fig. 2 is a diagrammatic vertical section of modification of Fig. 1, the rod having two live weights or masses at its ends.

In Fig. 2 an arrangement is shown in which two "live" masses, designated as 2 and 6, are fixed to the ends of the rod 1 to be tested, the direction of vibration of the one mass at any moment being the opposite of the vibration of the other mass. All special abutments or supports are done away with. The entire contrivance may be suspended freely or held in any manner that permits of unrestrained vibration of its parts. The armature 2 is fixed to one end of the rod 1 and so shaped that it almost abuts on the second live mass 6 fixed to the other end of the rod, this live mass 6 being in the form of an electromagnet provided with an exciting coil 7.

With the arrangement of Fig. 1 a tension may be applied to the rod 1 beforehand (before the electromagnet is excited) so that, when the test is made, the rod is subjected to tension only. To accomplish this the weight 2 must be made great enough to eliminate the compressional effect that arises when the mass 2 is pulled back from the electromagnet by the force of elasticity of the tested rod. Instead of using a large mass 2 the tension applied beforehand may be produced by sending a continuous current of suitable strength through the windings of the electromagnet 6. The stress applied beforehand might, if desired, be made to act in an opposite sense, i. e. it might be made to produce a constant compressional effect. This could be accomplished by placing the mass 2 at the top of the rod 1, or by so arranging the electromagnet that it exerts its pull on the upper side of the mass 2.

A special feature of the arrangement of Fig. 2 is a measuring device for determining the amplitude of the vibrations. This measuring device consists of a second small magnetic system attached to the masses 2 and 6 and comprising the armature 8 and the electromagnet 9 in whose coil 10 currents are induced when the masses 2 and 6 vibrate. These induced currents are measured by a measuring instrument 11 and their strength forms a basis for determining the amplitudes of the vibrations of 2 and 6. An acoustical method of determining these amplitudes is also feasible, this method consisting in observing the loudness of sounds produced in a telephone receiver connected in the place of 11. The utilization of a separate magnet system for these measurements, as shown for clearness in Fig. 2, is not imperative. The masses 2 and 6 themselves may be utilized as parts of an electromagnet in the induced currents of whose windings may form a basis for the desired measurements.

Figure 3:
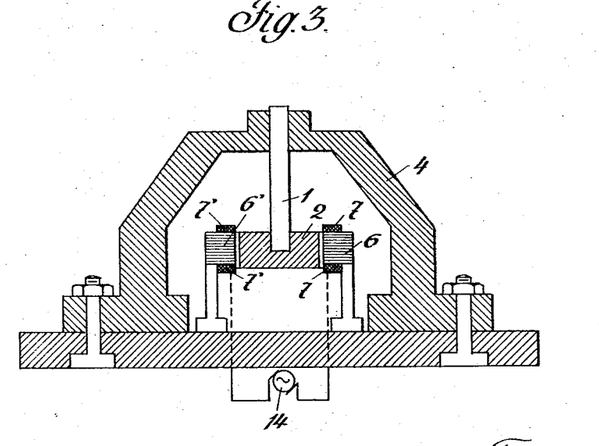
Figure 4:
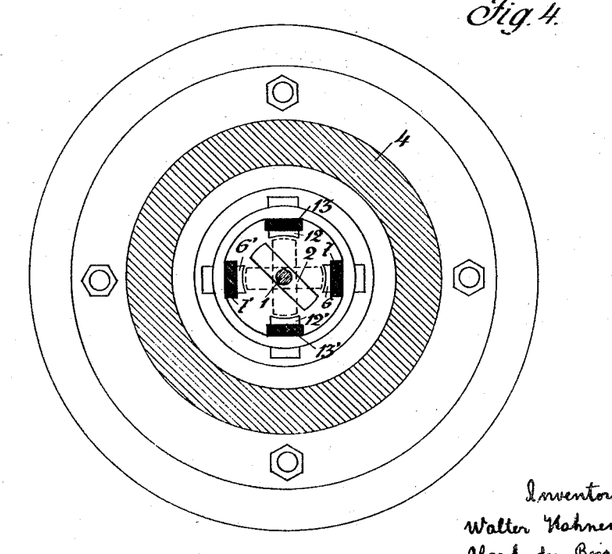
Fig. 4 a sectional plan view of a device which is adapted to apply torsional stresses to the rod under test by means of two adjacent-coils supplied with alternating currents differing in phase by 90°.
Figure 5:
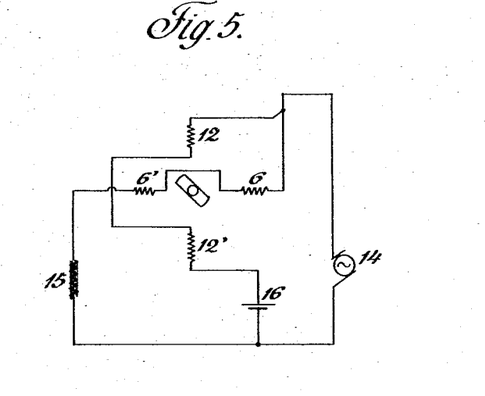
Fig. 5 shows the circuit arrangements associated with the coils of Fig. 4.

In Fig. 3 1 is the rod to be tested, this rod and the mass 2 forming the vibratory structure which is attached to the hood 4. The rod 1 and the mass 2 are firmly fixed to each other. The mass 2 is subjected to the influence of an alternating magnetic field produced by magnet poles 6, 12, 6¹, 12¹ displaced with respect to each by 90°. The alternating field which may be polarized is set up by pairs of coils 7, 7¹ and 13, 13¹ respectively which are supplied with current from an alternating current generator 14 in such a manner that the currents flowing through neighbouring coils differ in phase by 90°. The normal position of the mass 2 of the vibratory structure is indicated in Fig. 4 by solid lines. From the circuit diagram, Fig. 5, it will be seen that the difference of phase of 90° between the currents in the coils 6, 12, 6¹, 12¹ is obtained by inserting a condenser 16 in the one branch and an inductance 15 in the other branch of the supply mains emanating from the alternating current generator 14.

Figure 6:
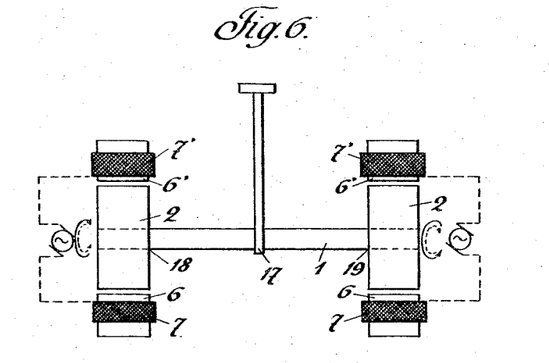
Fig. 6 is a diagrammatic representation of a device adapted to apply to a rod two oscillatory torsional effects whose phases are displaced with respect to each other by 180°, i. e. the effects at both ends of the rod always act in opposite rotary directions.

Fig. 6 is a diagrammatic representation of a contrivance of the aforementioned kind in which two vibratory torsional effects acting in opposite direction are applied to the material be tested. The shaft 1 to be tested is suspended at a point 17. Attached to the ends of the shaft are two equal masses 2 and 2¹ adapted to be moved in opposite directions—as indicated by the arrows—by the fields of electromagnets 6, 12, 6¹, 12¹. The torsional effects at each end change recurrently and rapidly from the one to the other direction as whenever the torsion at one end of the shaft acts in any one direction the torsion at the other will operate in the opposite direction. The magnetic fields are also produced in the manner indicated in Fig. 5.

Figure 7:
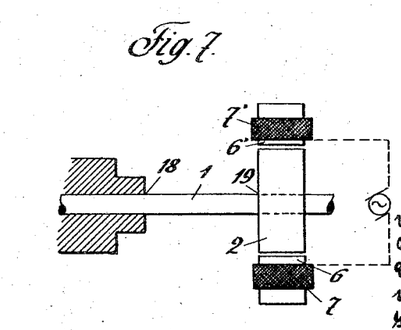
Fig. 7 illustrates the hereinbefore-mentioned method of testing bodies or rods, section by section.

Fig. 7 shows the equipment employed for testing material section by section. The shaft 1 to be tested has its one end fixed at 18 and together with the mass 2 it forms an oscillatory structure. Torsional vibrations of 2 are produced by means of a magnet field of the kind described in the preceding paragraphs. When the one section of the shaft 1 has been tested, the shaft is shifted longitudinally and another section of it may then be tested in the same way as the first.

Figure 8:
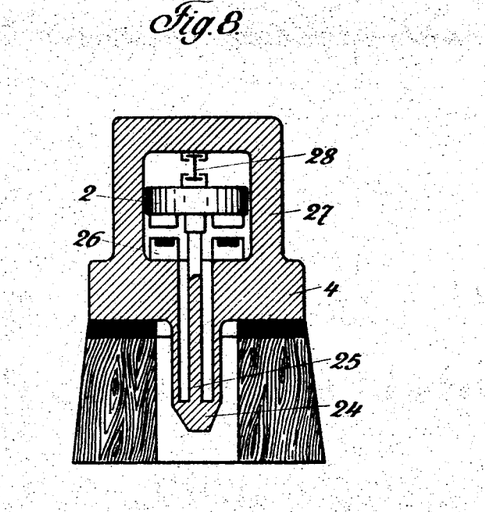
Fig. 8 is a diagrammatic vertical section of a resonance material tester in accordance with the invention and Fig. 9 an enlarged cross section of the field magnets of Fig. 8.
Figure 9:
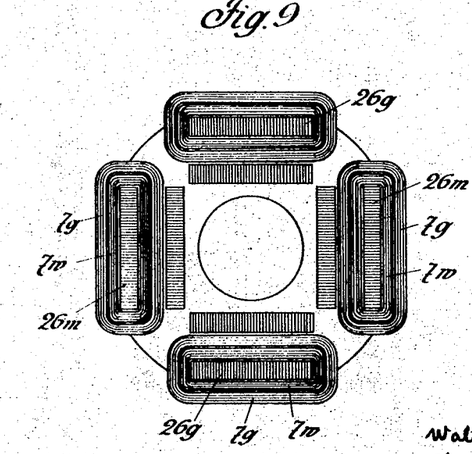

In Figs. 8 and 9, which represent a constructional form of a material tester in accordance with the invention, 4 is a heavy cylindrical body to which a tube 24 of large diameter is fixed, the free end of this tube being connected to a central, upwardly extending rod 25. The upper end of the rod bears a second cylindrical mass 2. The mass 2 with its stem 25 resembles a mushroom and the described parts may therefore be called an "acoustical mushroom". On the parts 4 and 2 being caused to move towards each other the tube 24 is expanded and the rod 25 is compressed. When the force causing the said parts 4 and 2 to approach each other is relaxed these parts 4 and 2 fly back into their normal positions. The device as a whole is thus a vibratory structure whose natural rate of vibration depends on the elasticity of the compound connecting stem 24, 25 and on the magnitude of the masses 4 and 2. The elasticity of the stem is proportional, (1) to the coefficient of elasticity of the material of which the stem or elastic connecting member consists, (2) to the cross section of the elements 24 and 25 of the stem, and inversely proportional to the sum of the lengths of 24 and 25. The amplitudes of 4 and 2 are inversely proportional to the magnitudes of these masses. By making the mass 2 small in comparison with 4 the amplitude of the vibrations of 4 can be made very small so that the foundation of the device or machine is preferably formed of this part which remains practically motionless when the device is used.

In a vibratory system of this kind the stresses in the elastic connecting member or stem at any prescribed amplitude are proportional to this amplitude and inversely proportional to the length of the compound or simple stem. By selecting a suitable length it is always possible to keep the stresses to which the stem is subjected under ordinary service conditions well within the limit of proportionality.

A set of electromagnets 26 is arranged between the two masses 4 and 2, the armature common to this set being fixed to the mass 2 and the windings being combined with the mass 4. The size of the air gap between the two masses may be such that it acts as a safeguard for the machine, in that the two masses or halves of the electromagnet would strike against each other whenever the machine is excited or caused to vibrate excessively, excessive expansions of the stem of the machine thus being precluded.

Arranged above the mass 4 is a yoke 27, and the piece of material or sample 28 to be tested is fixed between the yoke 27 and the mass 2.

The dimensions of the sample are made such that its total elastic force is small in comparison with the elastic force of the elastic connecting member or compound stem. By this means the natural rate of vibration of the entire vibratory system is only slightly increased by the insertion of the sample, the latter being connected in parallel with the elastic connecting member or stem.

On the other hand the length of the sample is made small in comparison with that of the stem and as the specific stress on the material at any given amplitude is inversely proportional to the length, it is always possible to produce a stress that is strong enough to tear the sample without the limit of proportionality being exceeded in the stem.

From the enlarged plan view, Fig. 9, it will be seen that the set of electromagnets comprises four individual field coils of which the two opposite coils $26^m$, $26^m$ are used for operating the system, i. e. for causing the masses to vibrate, while the two others $26^g$, $26^g$ are used for measuring purposes. Each of the four individual magnets has two coils, a continuous current coil $7^g$ and an alternating current coil $7^w$. The continuous current coils all obtain current from a common source of continuous current and serve to polarize the iron of the magnets.

The alternating current coils $7^w$ of the pair of power magnets or operating magnets $26^m$ are supplied with current from an alternating current generator. The magnetizations produced by the alternating current are superimposed on the magnetization due to the continuous current or polarizing coil $7^g$.

The vibrations of the armature cause an alternating potential to be induced in the alternating current coils $7^w$ of the field magnets $26^g$ for measuring purposes, and the said induced potential may be observed in a voltmeter and used as a basis for the determination of the amplitudes of the vibrations executed by the vibratory system of machine.

Figure 10:
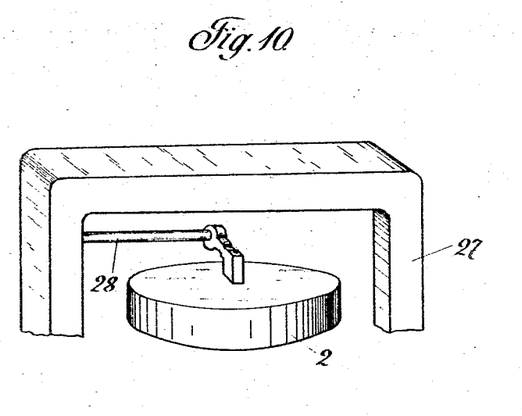
Fig. 10 shows a manner of obtaining torsional effects by the apparatus of Figs. 8 and 9.

This testing machine can also be easily arranged for the execution of bending and torsion tests. For torsion tests the sample rod is arranged to extend at right angles to the direction of the motion of the weight 2 and the force exerted by the latter may be applied to a point outside the longitudinal axis of the rod with the aid of an arm fixed to it. As shown in Fig. 10 the horizontally disposed rod 28 to be subjected to torsion may have its one end fixed in the frame 27 and torsional stresses are applied to its other end through an arm attached to the vibrating weight or mass 2.

Figure 11:
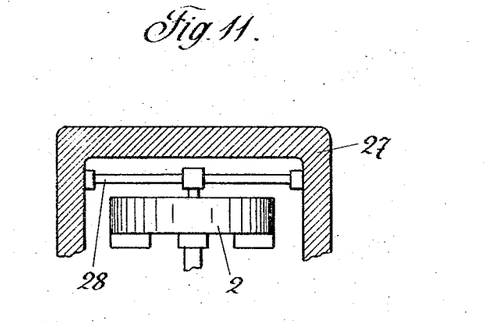
Fig. 11 shows a manner of obtaining bending effects by the apparatus of Figs. 8 and 9.

In Fig. 11 bending stresses are applied to the rod 28 by fixing its two ends in the frame 27 and attaching its middle point to the vibrating mass or weight 2.

Figure 12:
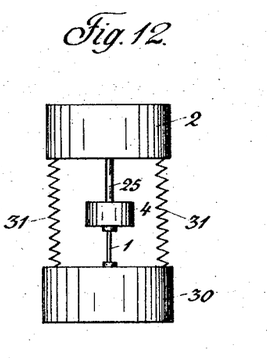
Fig. 12 is a diagrammatic elevation of a testing arrangement in which the rod or body to be tested is connected between the vibratory structure and a separate inert mass.

The arrangement illustrated in Fig. 12 comprises a vibratory structure consisting of two vibrating masses 2 and 4 joined together by an elastic connecting member or rod 25. An additional, independent, ponderous, inert mass 30 is provided which is suspended by springs 31, 31 from the mass 2. 1 is the rod to be tested, and it is connected between the "live" mass 4 and the inert mass 30.

Figure 13:
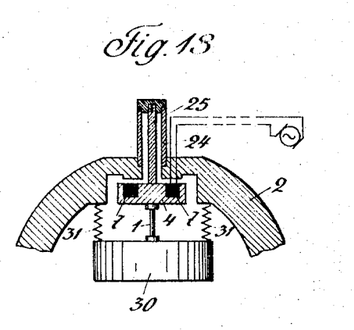
Fig. 13 is a section of a modification of Fig. 12.

In the modified arrangement of Fig. 13 the vibratory structure also comprises two masses 2 and 4. The elastic connecting member is made up of a rod 25 and a concentric tube 24. The mass 4 is arranged in the form of an electromagnet and the mass 2 is its armature. The vibratory structure is excited or set vibrating by current supplied from an alternating current generator to the coil 7. The independent inert mass 30 is held by springs 31, 31.

Figure 14:
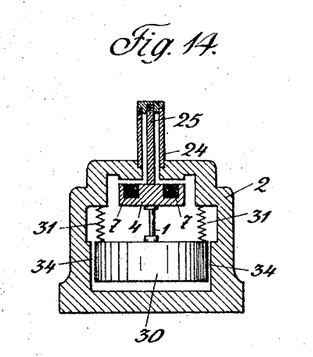
Fig. 14 is a section of another modification of Fig. 12 in which the inert mass is guided in its longitudinal movements by a special guide member.

In the further modification of Fig. 12 shown in Fig. 14 similar parts have similar signs of reference. The difference from the arrangement of Fig. 13 consists in the independent inert mass 30 being guided at 34 in order to preclude transverse oscillations. In the arrangements of Figs. 13 and 14 the rod I to be tested is fixed between the electromagnet or mass 4 and the independent, ponderous, insert mass 30.

Figure 15:
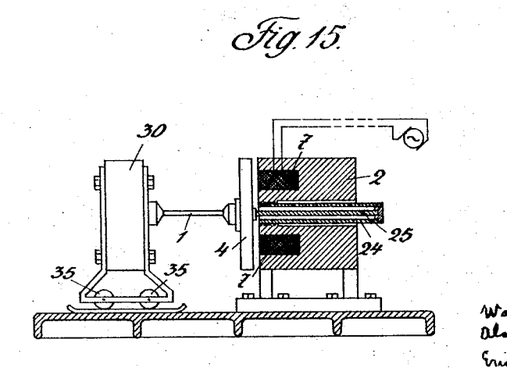

In the machine illustrated in Fig. 15 the vibratory structure or system 2, 25, 24, 4 is arranged in a horizontal position, and the independent inert mass 30 is mounted on rollers or balls 35 in such a way that it may be bodily moved in the direction of the vibrations executed by the vibratory system although it is practically motionless to the action of these vibrations. The rod I to be tested is attached at its one end to the vibratory system and at its other to the mass 30. The distance to which the inert mass 30 is shifted from the vibratory system when longitudinal vibrations are to be set up in a rod is equal to the statical length of the sample rod to be tested. An essential feature of this arrangement is that the independent, ponderous mass is arranged in such a manner that the direction of its gravity extends at right angles to the direction of the vibrations of the vibratory system, so that its weight cannot affect this system.

The operation of the arrangements of Figs. 12 to 15 is such that during its expansion the rod 1 being tested need not operate against the entire force of the elastic connecting member of the vibratory structure itself, but that it has only to overcome the force that supports the independent inert mass 30. Thus in the case of the diagrammatically represented examples of devices (Figs. 12 to 14) the tested rod during its expansion has only to slightly expand the springs 31, 31. The springs are made of such size that they carry practically the entire weight of the mass 30 but only offer little resistance to the tested rod when it is expanded to a small extent. The system comprising the springs 31, 31 and the mass 30 has a very low natural rate of vibration, while the vibratory system proper has a comparatively high natural rate of vibration. Hence there is no coupling between these two systems and consequently their respective vibrations do not influence each other.

The advantage of apparatus or machines constructed in accordance with the invention consists in the first place in their simplicity in use inasmuch as it is always possible to operate with the same or nearly the same frequency; secondly in the fact that the utilization of the resonance of the system renders it possible to employ very great amplitudes, and finally in the absence of rotary or other moving parts with the exception of the vibrating masses of the vibratory structure itself. The apparatus can be made in all sizes for the smallest and largest stresses and all quantities of material. They are also much smaller for the same forces than corresponding machines of known kinds and the possibility of using any high frequency enables the duration of the test to be shortened to a corresponding considerable extent. The apparatus may, of course, be just as advantageously used when the frequency required is low.

We claim:—

1. The method of testing materials, which comprises exciting a vibratory structure to vibrations in its natural frequency; causing the vibrations of the said structure to be imparted to a test-piece of the material to be tested; and observing the number and amplitude of vibrations of the vibratory system represented by the said vibratory structure together with the test-piece.

2. The method of testing materials, which comprises exciting a vibratory structure to vibrations in its natural frequency; causing the vibrations of the said structure to be imparted to a test-piece of the material to be tested built up as a part of the said structure; and observing the number and amplitude of vibrations of the vibratory system represented by the said vibratory structure together with the test-piece.

3. The method of testing materials, which comprises exciting a vibratory structure formed of separate masses and elastic members to vibrations in its natural frequency; causing the vibrations of the said structure to be imparted to a test-piece of the material to be tested built up as a part of the said structure; and observing the number and amplitude of vibrations of the vibratory system represented by the said vibratory structure together with the test-piece.

4. A device for testing materials, comprising a vibratory system having a definite natural frequency and composed of separate masses connected by an elastic member; means for causing said system to vibrate in its natural frequency; and means for subjecting the material to be tested to the forces acting in the vibratory system.

5. A device for testing materials, comprising a vibratory system having a definite natural frequency, and composed of separate masses connected by an elastic member in which substantially all the elasticity of said system resides; means for causing said system to vibrate in its natural frequency; and means for subjecting the material to be tested to the forces acting in the vibratory system.

6. A device for testing materials, comprising a vibratory system having a definite natural frequency and composed of separate masses connected by an elastic member; means for causing said system to vibrate in its natural frequency; and means for subjecting the material to be tested to the forces acting in the vibratory system; the said elastic member extending lengthwise in the direction of the forces acting in the vibratory system.

7. A device for testing materials, comprising a vibratory system having a definite natural frequency and composed of separate masses connected by an elastic member; means for causing said system to vibrate in its natural frequency; and means for subjecting the material to be tested to the forces acting in the vibratory system; the said elastic member comprising concentrically arranged parts extending lengthwise in the direction of the forces acting in the vibratory system.

8. A device for testing materials, comprising a vibratory system having a definite natural frequency; means for causing said system to vibrate in its natural frequency; and means for subjecting the material to be tested to the forces acting in the vibratory system; the total elastic force of the vibratory system being arranged to be great as compared with the total elastic force of the material under test.

9. A device for testing materials, comprising a vibratory system having a definite natural frequency and composed of separate masses connected by an elastic member; means for causing said system to vibrate in its natural frequency; and means for subjecting the material to be tested to the forces acting in the vibratory system; the total elastic force of the elastic member being arranged to be great as compared with the total elastic force of the material under test.

10. A device for testing materials, comprising a vibratory system having a definite natural frequency; means for causing said system to vibrate in its natural frequency; a mass immovable to the vibrations of said system; and means for attaching a test-piece of the material to be tested between the vibratory system and said immovable mass so as to subject the test-piece to the forces acting in the vibratory system.

11. A device for testing materials, comprising a vibratory system having a definite natural frequency and composed of separate masses connected by an elastic member; means for causing said system to vibrate in its natural frequency; a mass immovable to the vibrations of said system; and means for attaching a test-piece of the material to be tested between the immovable mass and one of the masses of the vibratory system so as to subject the test-piece to the forces acting in the vibratory system.

12. A device for testing materials, comprising a vibratory system having a definite natural frequency and composed of a comparatively large mass and a comparatively small mass connected by an elastic member; means for causing said system to vibrate in its natural frequency; a mass immovable to the vibrations of said system; and means for attaching a test-piece of the material to be tested between the immovable mass and the comparatively small mass of the vibratory system so as to subject the test-piece to the forces acting in the vibratory system.

13. A device for testing materials, comprising a vibratory system having a definite natural frequency and composed of a comparatively large mass and a comparatively small mass connected by an elastic member; means for causing said system to vibrate in its natural frequency; a comparatively large mass immovable to the vibrations of said system; means for attaching a test-piece of the material to be tested between said comparatively small mass and said immovable mass; and a support for said comparatively large mass and said immovable mass; said comparatively large mass being rigidly, and said immovable mass being yieldingly, connected to the support.

In testimony whereof we affix our signatures.

WALTER HAHNEMANN.
ALARD DU BOIS-REYMOND.
GUSTAV WOLFF.
ERICH ROTHER.
WILHELM RUDOLPH.